United States Patent
Kimura et al.

(10) Patent No.: US 10,521,201 B2
(45) Date of Patent: Dec. 31, 2019

(54) INFORMATION PROCESSING APPARATUS AND METHOD

(71) Applicant: FUJITSU LIMITED, Kawasaki-shi, Kanagawa (JP)

(72) Inventors: Kosaku Kimura, Kawasaki (JP); Shridhar Choudhary, Kawasaki (JP); Atsuji Sekiguchi, Kawasaki (JP); Yusuke Sasaki, Kawasaki (JP); Masaru Ueno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/972,365

(22) Filed: May 7, 2018

(65) Prior Publication Data
US 2018/0329692 A1 Nov. 15, 2018

(30) Foreign Application Priority Data
May 10, 2017 (JP) .................. 2017-093526

(51) Int. Cl.
*G06F 8/36* (2018.01)
*G06F 8/41* (2018.01)

(52) U.S. Cl.
CPC . *G06F 8/36* (2013.01); *G06F 8/41* (2013.01)

(58) Field of Classification Search
CPC .................................. G06F 8/10; G06F 8/30
USPC .................................................. 717/104, 106
See application file for complete search history.

(56) References Cited

U.S. PATENT DOCUMENTS

| | | | | |
|---|---|---|---|---|
| 7,240,327 B2 * | 7/2007 | Singh | ........................ | G06F 8/30 717/108 |
| 2004/0205729 A1 * | 10/2004 | Iwashita | ................... | G06F 8/41 717/136 |
| 2013/0263092 A1 | 10/2013 | Chikahisa et al. | | |
| 2013/0271476 A1 * | 10/2013 | Treiman | .................... | G06F 8/30 345/522 |
| 2015/0268881 A1 * | 9/2015 | Nielsen | ............... | G06F 11/1438 711/114 |

(Continued)

FOREIGN PATENT DOCUMENTS

WO 2012/057170 5/2012

OTHER PUBLICATIONS

Lu et al., "Pattern-based Deployment Service for Next Generation Clouds" (Year: 2013).*

(Continued)

*Primary Examiner* — Phillip H Nguyen
(74) *Attorney, Agent, or Firm* — Fujitsu Patent Center

(57) ABSTRACT

A memory holds a code pattern, a first template indicating a format of a program which defines that a system performs certain processing in response to a processing request, and a second template indicating a format of a program which sends the processing request to the system via a network. A processor generates, by acquiring a first program, detecting a first code matching the code pattern in the first program, and using the first code and the first template, a second program which defines that the system performs processing corresponding to the first code. The processor generates, by detecting a second code dependent on the first code in the first program and using the second code and the second template, a third program to be executed by another system different from the system.

9 Claims, 17 Drawing Sheets

(56) References Cited

U.S. PATENT DOCUMENTS

2015/0350016 A1* 12/2015 Gundugola ........... H04L 41/145
                                                                     709/223

OTHER PUBLICATIONS

Tsai et al., "Service-Oriented Cloud Computing Architecture" (Year: 2010).*
Anja Strunk, "QoS-Aware Service Composition: A Survey", Proceedings of the 8th IEEE European Conference on Web Services (ECOWS), pp. 67-74, Dec. 2010 (8 pages).

* cited by examiner

FIG. 5

| CLOUD SYSTEM NAME | AUTHENTICATION INFORMATION |
|---|---|
| SYSTEM A | accessKeyId: 'xxx'<br>secretAccessKey: 'yyy'<br>region: 'us-west-2'<br>accountId: '123' |
| SYSTEM B | uri: 'https://otherservices.com'<br>username: 'user'<br>password: 'pass' |

ENVIRONMENT SETTING STORAGE UNIT

ENVIRONMENT SETTING MANAGEMENT TABLE — 141

PROGRAM STORAGE UNIT — 122

PROGRAM (UNCONVERTED) — 142

```
'use strict';
const express = require('express');
const bodyParser = require('body-parser');
const Email = require('email').Email;
const app = express();

var csv = { };

app.use(bodyParser.urlencoded({ extended: true }));
app.use(bodyParser.json());

app.post( '/csv' , function(req, res) {
   const name = req.body.name;
   const object = req.body.object;
   csv[name] = object;
   for (const record of csv[name].split(/¥r¥n|¥r|¥n/)) {
      const fields = record.split(',');
      new Email({
         from: 'foo@bar.com', to: 'baz@qux.com',
         subject: 'hello', body: 'hello, world'
      }).send();
   }
   res.end(JSON.stringify({'name': name, 'object': object}));
});

const port = process.env.PORT | 3000;
app.listen(port, function() {
   console.log(`app listening on port ${port}`);
});
```

CONSTRAINT INFORMATION — 143

```
runOnDemand: true
scalable: true
```

FIG. 8

CONVERSION RULE STORAGE UNIT — 123

CONVERSION RULE TABLE

| RULE ID | RULE NAME | CODE PATTERN | APPLIED CONDITION | TEMPLATE | PRIORITY LEVEL — 145 |
|---|---|---|---|---|---|
| 1 | RunOnServer | ROOT NODE | — | (EXECUTION OF ALL CODES IN SERVER FUNCTIONS) | HIGH |
| 2 | DeclareContainer | EMPTY VARIABLE DECLARATION | runOnDemand=true | (CREATION OF CONTAINER) | HIGH |
| 3 | PutInContainer | ASSIGNMENT STATEMENT OF VARIABLE | APPLICATION OF RULE 2 TO VARIABLE | (PUT IN CONTAINER) | HIGH |
| 4 | DeclareFunction BehindContainer | STATEMENT USING VARIABLE AFTER ASSIGNMENT STATEMENT | APPLICATION OF RULE 3 TO VARIABLE | (CREATION OF FaaS FUNCTION) | MEDIUM |
| 5 | ParallelizeForOf | for-of BLOCK | runOnDemand=true & scalable=true | (CREATION OF CONTAINER AND FaaS FUNCTION) | LOW |

CONVERSION RULE STORAGE UNIT

TEMPLATE          ,-145a

```
const asys = require('Asystem-sdk');
const os = new Asystem.ObjectStorage({
    accessKeyId: '%= settings.asys.accessKeyId %',
    secretAccessKey: '%= settings.asys.secretAccessKey %',
    region: '%= settings.asys.region %'
});
new Promise((resolve, reject) => {
  os.putObject({
      Bucket: '%= left.object.name %',
      Key: '%= left.property.name %',
      Body: <%= right %>
  }, (err, result) => {
      if (err) {
          console.log(err);
      }
      resolve(result);
  });
}).then(<%= arg %> =>
  {%= then %}
);
```

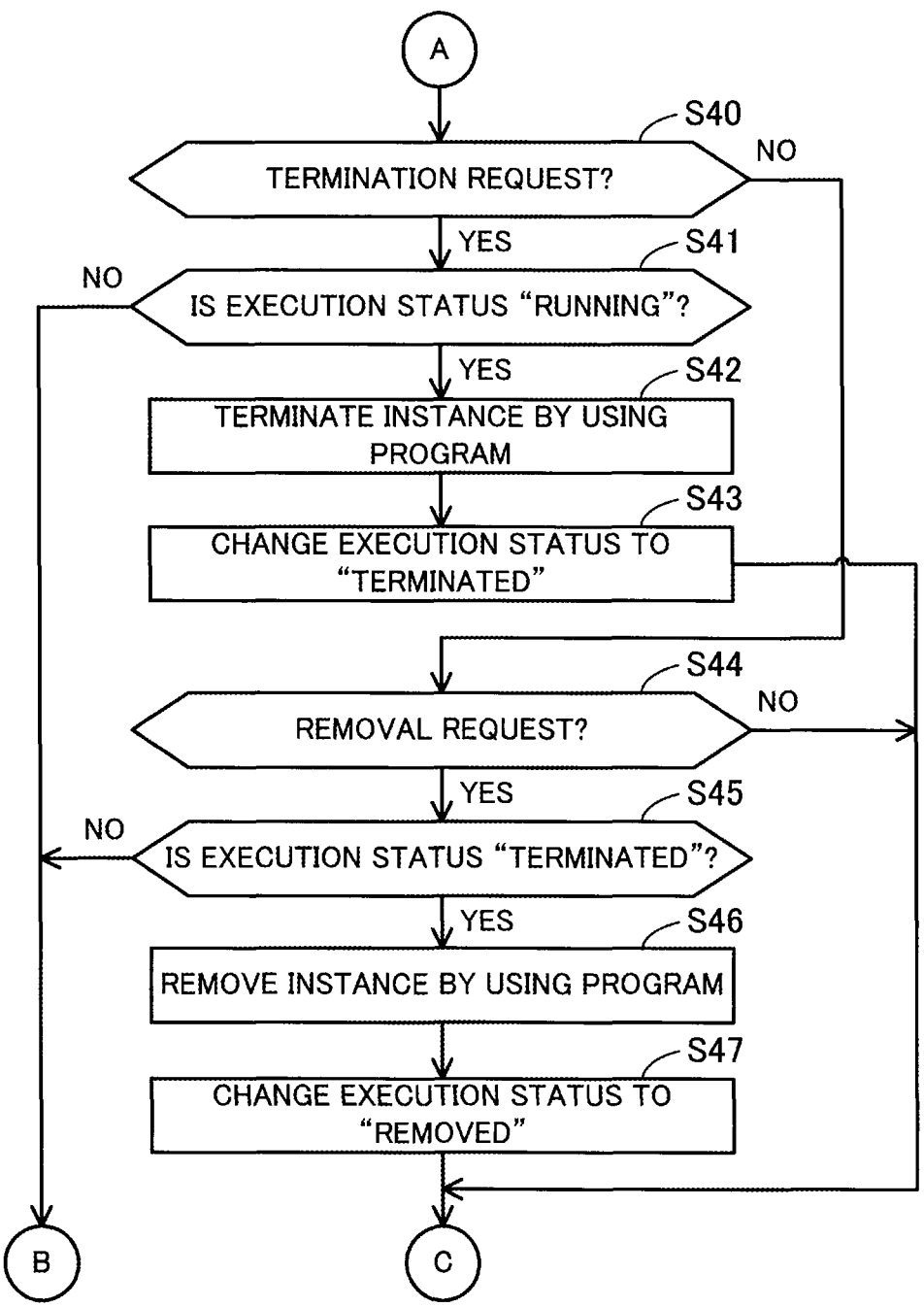

INFORMATION PROCESSING APPARATUS AND METHOD

CROSS-REFERENCE TO RELATED APPLICATION

This application is based upon and claims the benefit of priority of the prior Japanese Patent Application No. 2017-093526, filed on May 10, 2017, the entire contents of which are incorporated herein by reference.

FIELD

The present invention relates to an information processing apparatus and method.

BACKGROUND

More and more users have recently been using information processing environments of service providers via networks, instead of possessing their own information processing environments in which application software is executed. Services for allowing users to use information processing environments via networks are often called "cloud services". For example, an information processing environment usable as a cloud service includes calculation hardware such as a processor or a memory, a local network, infrastructure software such as an operating system (OS) or a database, and a security mechanism.

There are various kinds of cloud services. For example, in one kind of service, a service provider rents a unit calculation resource such as a physical machine or a virtual machine to a user, and the user executes an application program created by himself or herself on the unit calculation resource. In another kind of service, a service provider deploys a lightweight program created by a user and executes this lightweight program only for a short time when a certain event occurs. In still another service, a service provider holds data received via a network.

In a cloud service, a service provider previously receives a program, setting information, or the like from a user and sets processing desired by the user so that this processing is executable in an information processing environment of the could service. Next, in the cloud service, the above set processing is performed in response to a processing request. A cloud service offers an application programming interface (API), and a program outside the cloud service is able to use this API to request processing. Thus, a developer is able to develop distributed processing software that allows a certain cloud service and a program outside this cloud service to coordinate with each other. The program outside this cloud service could be executed in another cloud service.

There has been proposed a conversion apparatus that converts a source code into an inspection code for a model inspection tool. This source code conversion apparatus receives a source code, conversion rules, a nonfunctional requirement which is a constraint relating to a processing time or a storage capacity. The source code conversion apparatus applies the conversion rules to the source code and generates an inspection code for inspecting whether the nonfunctional requirement is satisfied. In addition, there has been proposed a method in which, when an application is developed by combining a plurality of cloud services, a combination of cloud services is selected in such a manner that the quality of service (QoS) of the whole application is optimized. See, for example, the following documents:

International Publication Pamphlet No. 2012/057170; and

Anja Strunk, "QoS-Aware Service Composition: A Survey", Proceedings of the 8th IEEE European Conference on Web Services (ECOWS), pp. 67-74, Dec. 1, 2010.

However, when a developer directly writes a distributed processing program using cloud services, since fragmented programs and setting information are separately deployed in a plurality of information processing environments, it is difficult to understand the whole information processing procedure. In addition, to use a cloud service, the developer needs to write the program in accordance with a unique API or rule defined by the corresponding service provider. Thus, the development efficiency of the distributed processing program could be reduced.

SUMMARY

According to an aspect, there is provided an information processing apparatus including: a memory configured to hold a code pattern, a first template indicating a format of a program which defines that a system performs certain processing in response to a processing request, and a second template indicating a format of a program which sends the processing request to the system via a network; and a processor configured to generate, by acquiring a first program, detecting a first code matching the code pattern in the first program, and using the first code and the first template, a second program which defines that the system performs processing corresponding to the first code and to generate, by detecting a second code dependent on the first code in the first program and using the second code and the second template, a third program to be executed by another system different from the system.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of an environment setting management table;

FIG. 6 illustrates an example of an unconverted program and constraint information;

FIG. 8 illustrates an example of a conversion rule table;

FIG. 9 illustrates an example of a template included in the conversion rule table;

FIGS. 16 and 17 are flowcharts illustrating an example of a procedure for an activation service.

DESCRIPTION OF EMBODIMENTS

Figure 1:
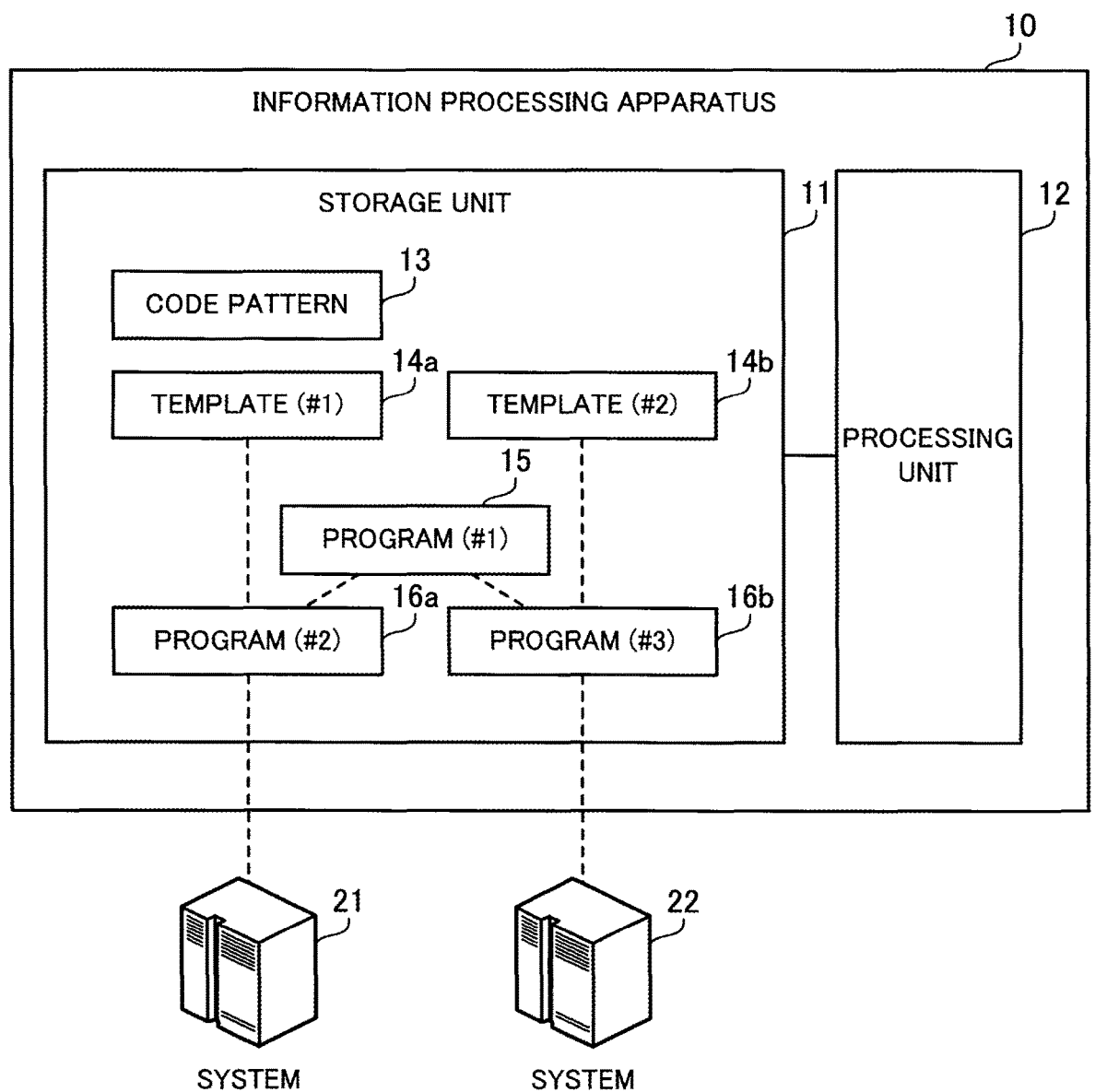
FIG. 1 illustrates an information processing apparatus according to a first embodiment.

Embodiments will be described below with reference to the accompanying drawings, wherein like reference characters refer to like elements throughout.

[First Embodiment]

A first embodiment will be described.

FIG. 1 illustrates an information processing apparatus according to a first embodiment.

This information processing apparatus 10 according to the first embodiment supports development of a distributed processing program applied to systems 21 and 22. The information processing apparatus 10 includes a storage unit 11 and a processing unit 12. The storage unit 11 may be a volatile semiconductor memory such as a random access memory (RAM) or a non-volatile storage device such as a hard disk drive (HDD) or a flash memory. For example, the processing unit 12 is a processor such as a central processing unit (CPU) or a digital signal processor (DSP). The processing unit 12 may include an electronic circuit for specific use such as an application specific integrated circuit (ASIC) or a field programmable gate array (FPGA). The processor executes programs stored in a memory such as a RAM (for example, the storage unit 11). A group of processors will hereinafter be referred to as a "multiprocessor" or simply a "processor", as needed.

The storage unit 11 holds a code pattern 13, a template 14a (a first template), and a template 14b (a second template). The code pattern 13 is a pattern of codes indicating processing convertible to processing executable in the system 21, among codes (a group of commands) that could appear in a program created by a developer. The code pattern 13 may be stored in association with the template 14a.

The template 14a indicates a format (a template) of a program which defines that the system 21 performs certain processing in response to a processing request. The template 14a may adopt a program description method unique to the system 21 so as to set the system 21. For example, the template 14a is a format of a program executed by the system 21 or a format of a program for sending setting information to the system 21. The template 14b indicates a format (a template) of a program for sending a processing request to the system 21 via a network. The template 14b may adopt a program description method unique to the system so as to send a processing request for causing the system 21 to execute processing.

For example, the system 21 according to the first embodiment is a cloud system that offers a cloud service. In response to a processing request received via a network, the system 21 performs processing by using a preset program, setting information, etc. Examples of the processing executable by the system 21 include processing of a message received from a network, execution of a function in response to a request from a network, and storage of data received from a network. For example, the template 14a indicates a format of a function program, and the template 14b indicates a format of a function-call program. Alternatively, for example, the template 14a indicates a format of a program that sets a data storage location, and the template 14b indicates a format of a program that requests writing or reading of data.

The system 22 may be another cloud system that offers a different cloud service. In this case, the template 14b also indicates a format of a program which defines that the system 22 performs certain processing. In this way, a developer is able to generate a distributed processing program that allows the plurality of cloud services on the systems 21 and 22 to coordinate with each other.

The processing unit 12 acquires a program 15 (a first program). The program 15 is created by the developer. The program 15 may be a program that has been created without regard to the settings of the system 21 or a processing request via a network.

The processing unit 12 performs pattern matching to detect a code (a first code) matching the code pattern in the program 15. Next, the processing unit 12 generates a program 16a by using the first code and the template 14a. The program 16a defines that the system 21 performs processing corresponding to the first code. For example, the processing unit 12 generates the program 16a by assigning a value extracted from the first code to an argument in the template 14a. The program 16a is applied to the system 21. For example, the program 16a is sent to and executed by the system 21. In addition, for example, setting information is sent to the system 21 in accordance with a procedure defined by the program 16a.

In addition, the processing unit 12 detects another code (a second code) dependent on the first code in the program 15. For example, when the first code indicates the definition of a variable, the second code indicates assignment of a value to the variable or calculation using a value assigned to the variable. Another code pattern may be stored in the storage unit 11 in association with the template 14b, and the second code may be detected through pattern matching. The processing unit 12 generates a program 16b by using the second code and the template 14b. For example, the processing unit 12 generates the program 16b by assigning a value extracted from the second code to an argument in the template 14b. The program 16b is applied to the system 22 different from the system 21. For example, the program 16b is sent to and executed by the system 22.

The information processing apparatus 10 according to the first embodiment detects the first code 5 matching the code pattern 13 in the program 15 and uses the template 14a to generate the program 16a that defines that processing corresponding to the first code is executed on the system 21. In addition, the information processing apparatus 10 detects the second code dependent on the first code in the program 15 and uses the template 14b to generate the program 16b that requests the system 21 to perform processing.

In this way, the developer does not need to directly write fragmented programs or setting information applied to the system 21 or 22. Namely, since the developer is able to easily understand the whole information processing procedure, the developer is able to focus on the definition of the whole information processing procedure. In addition, since the developer does not need to learn formats unique to the settings of the system 21 or processing requests sent to the system 21, the learning cost is reduced. Thus, the development efficiency of a distributed processing program using the systems 21 and 22 is improved.

[Second Embodiment]

Next, a second embodiment will be described.

Figure 2:
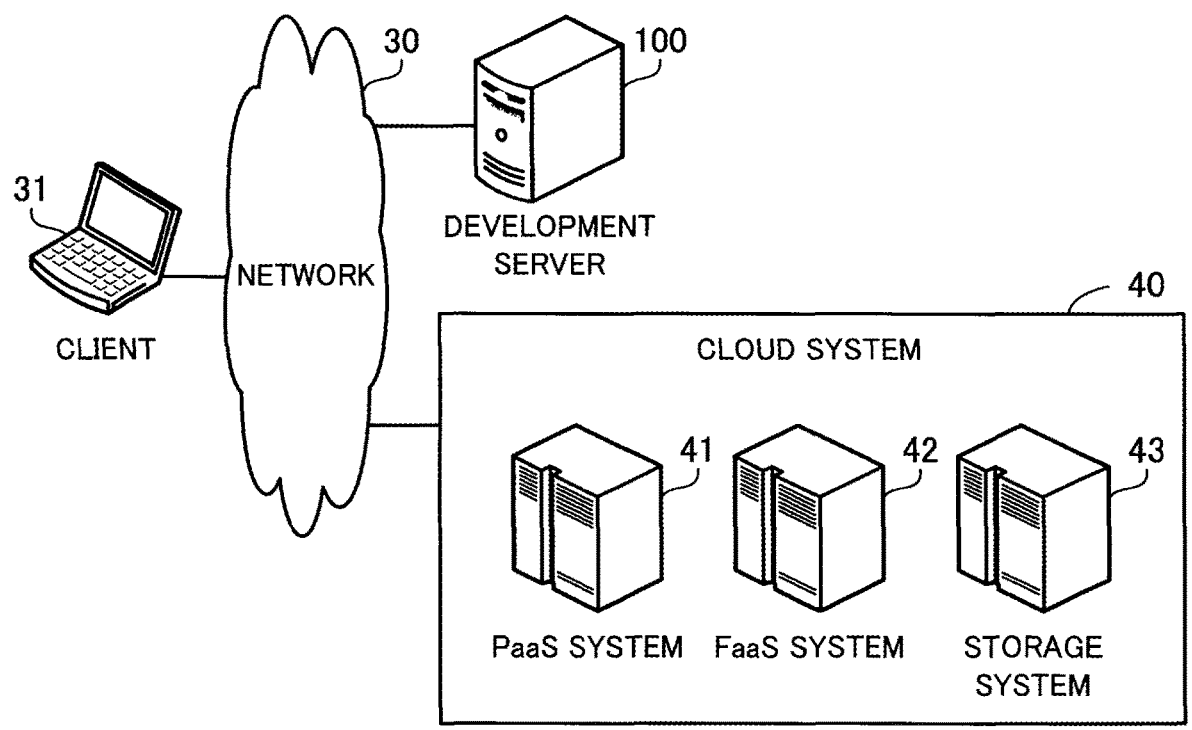
FIG. 2 illustrates an example of an information processing system according to a second embodiment.

FIG. 2 illustrates an example of an information processing system according to a second embodiment.

The information processing system according to the second embodiment supports development of application software implemented by combining a plurality of cloud services. The information processing system includes a client 31, a cloud system 40, and a development server 100. The client 31, the cloud system 40, and the development server 100 are connected to a network 30. The network 30 is, for example, a wide-area data communication network such as the Internet. The development server 100 corresponds to the information processing apparatus 10 according to the first embodiment.

The client 31 is a client computer used by a developer who develops application software. The client 31 accesses the development server 100 via the network 30 and develops application software interactively with the development server 100. In addition, the client 31 instructs the development server 100 to deploy the developed application software in the cloud system 40. For example, when a web browser is installed on the client 31, the client 31 accesses the development server 100 via the web browser so that the developer is able to edit a source code of a program on the web browser. In addition, the client 31 instructs deployment of the application software via the web browser.

The development server 100 is a server computer that supports development of application software deployable in the cloud system 40. In particular, the development server 100 supports development of distributed processing software that coordinates a plurality of cloud services offered by the cloud system 40. The development server 100 receives information inputted by the developer from the client 31 via the network 30, creates a program on the basis of the inputted information, and holds the program.

In this case, the developer does not need to directly write cloud-service-specific processing for coordinating a plurality of cloud services in a program. Thus, the developer is able to focus on the definition of the substantive information processing procedure (the core logic). Namely, the developer is able to create a program as if its entire core logic is executed in a closed environment on a single computer. The development server 100 converts the program, which has been created on the basis of the information inputted by the developer, into a group of programs for distributed processing software in which a plurality of cloud services are combined.

When the development server 100 receives a deployment instruction from the client 31, the development server 100 uses the group of converted programs and deploys service entities (which may also be referred to as "service instances") activated by the corresponding application software in the cloud system 40. A plurality of instances constituting the service instances are separately deployed in a plurality of server computers in the cloud system 40.

The instances could include one that is previously activated on a server computer and waits for occurrence of an event such as reception of a request message. The instances could also include one that is activated when an event occurs and that is deleted when processing corresponding to the event is completed. When deploying a service instance, there are cases in which the development server 100 sends a converted program to a server computer and causes the server computer to execute the converted program or to set the converted program in an executable state. There are also cases in which the development server 100 sends setting information indicating settings of a service instance to a server computer in accordance with a converted program (for example, by executing a converted program). The converted programs and setting information are sent to the server computers in the cloud system 40 in accordance with rules of the cloud services to be used.

When the development server 100 receives an instruction for termination of a service instance from the client 31, the development server 100 causes the cloud system 40 to terminate the service instance by using the group of converted programs. In addition, when the development server 100 receives an instruction for removal of a service instance from the client 31, the development server 100 removes data relating to the service instance from the cloud system 40 by using the group of converted programs. In this way, the client 31 does not need to instruct the individual cloud services about the deployment, termination, and removal of service instances. Instead, the development server 100 comprehensively performs all the deployment, termination, and removal of service instances.

The cloud system 40 is an information processing system possessed by a single cloud operator and is installed in a data center, for example. While only one cloud system possessed by a single cloud operator is connected to the network 30 in FIG. 2, a plurality of cloud systems possessed by a plurality of cloud operators may be connected to the network 30.

The cloud system 40 includes a PaaS (Platform as a Service) system 41, a FaaS (Function as a Service) system 42, and a storage system 43. Each of the PaaS system 41, the FaaS system 42, and the storage system 43 includes at least one server computer. The PaaS system 41 offers a PaaS service to users. The FaaS system 42 offers a FaaS service to users. The storage system 43 offers an object storage service to users. In this way, the cloud system 40 offers a plurality of cloud services of different kinds. The cloud system 40 may additionally offer different kinds of cloud services such as a database service and a message queue service.

The PaaS system 41 allows a user to use an infrastructure platform on which application software is executed. The platform includes, for example, hardware such as a CPU or a memory, an OS, and middleware. The platform used by the user may be a virtual machine. The user of the PaaS system 41 deploys an application program on the platform and causes the PaaS system 41 to execute the application program.

The FaaS system 42 dynamically executes a "function" when an event such as reception of a request message or updating of data occurs. A FaaS function is a relatively small processing unit and implemented by a relatively small program. A user of the FaaS system 42 uploads a function program to the FaaS system 42 in advance. When the FaaS system 42 detects an event, the FaaS system 42 loads the function program corresponding to the detected event to a memory and executes the function. After executing the function, the FaaS system 42 may remove the function program from the memory. Thus, instead of being previously activated and brought in a standby state, the function is automatically activated when an event occurs and is executed only for a short time. A data update in the storage system 43 may be an event, which triggers activation of a function, by using a webhook.

The storage system 43 is a lightweight non-volatile storage system that holds object data in a key-value format. A user of the storage system 43 registers a data storage location called a "container" in the storage system 43 in advance. The container corresponds to a directory, for example. The storage system 43 offers a PUT API for writing object data in a container via a network and a GET API for reading object data from a container via a network. The storage system 43 writes object data in a container in response to calling of the PUT API and reads object data from a container in response to calling of the GET API.

To coordinate the function of the FaaS system 42 and the container of the storage system 43, the FaaS system may monitor updates of the storage system 43 or the storage system 43 may notify the FaaS system 42 of data updates.

Next, a development example of application software in which the PaaS service, the FaaS service, and the object storage service are combined will be described. This application software performs information processing by coordinating the program of the PaaS system 41, the function of the FaaS system 42, and the container of the storage system 43 when the PaaS system 41 receives a request message.

Figure 3:
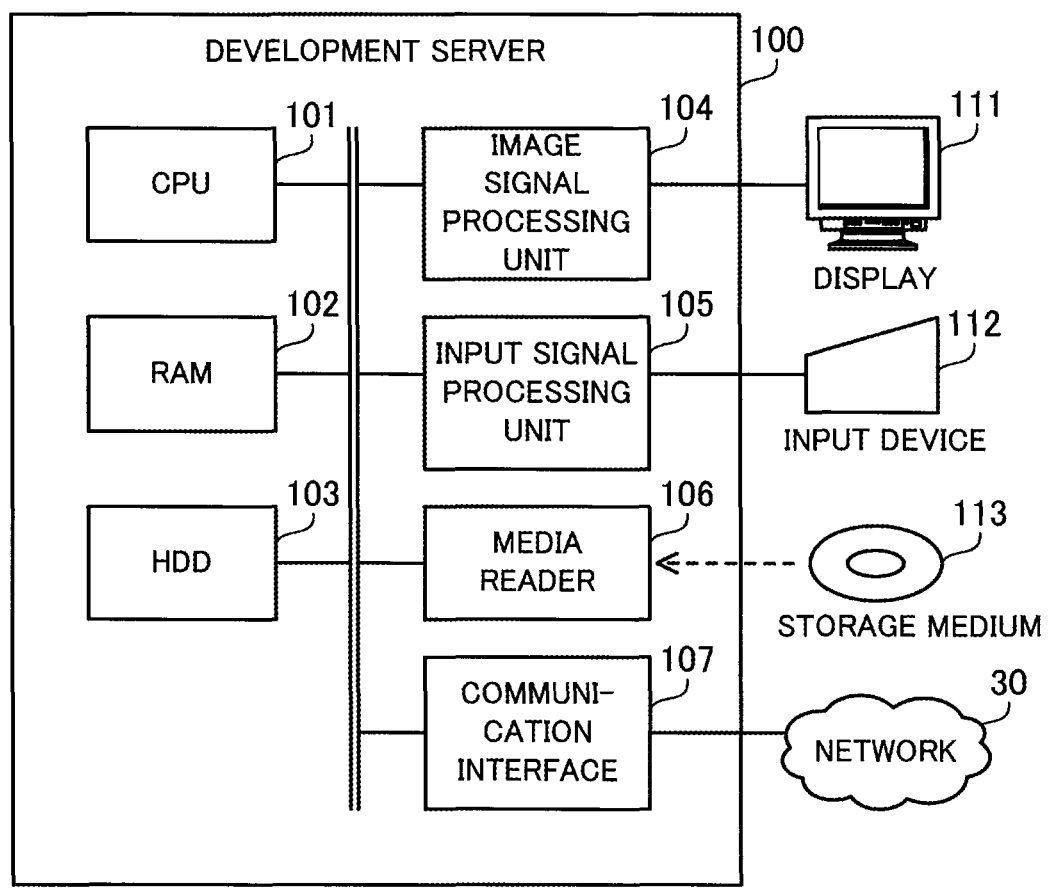
FIG. 3 is a block diagram illustrating a hardware example of a development server.

FIG. 3 is a block diagram illustrating a hardware example of the development server. The development server 100 includes a CPU 101, a RAM 102, an HDD 103, an image signal processing unit 104, an input signal processing unit 105, a media reader 106, and a communication interface 107. The client 31 may be implemented by using the same hardware as that of the development server 100. In addition, the server computers used for the PaaS system 41, the FaaS system 42, and the storage system 43 may also be implemented by using the same hardware as that of the development server 100. The CPU 101 corresponds to the processing unit 12 according to the first embodiment. The RAM 102 or the HDD 103 corresponds to the storage unit 11 according to the first embodiment.

The CPU 101 is a processor that executes program commands. The CPU 101 loads at least a part of a program or data stored in the HDD 103 to the RAM 102 and executes the program. The CPU 101 may include a plurality of processor cores, and the development server 100 may include a plurality of processors. The processing described below may be executed in parallel by using a plurality of processors or processor cores. In addition, a group of processors will be referred to as a "multiprocessor" or simply a "processor", as needed.

The RAM 102 is a volatile semiconductor memory that temporarily holds a program executed by the CPU 101 or data used by the CPU 101 for calculation. The development server 100 may include a different kind of memory other than a RAM or include a plurality of memories.

The HDD 103 is a non-volatile storage device that holds an OS, middleware, software programs such as for application software, and data. The development server 100 may include a different kind of storage device such as a flash memory or a solid state drive (SSD) or include a plurality of non-volatile storage devices.

The image signal processing unit 104 outputs an image to a display 111 connected to the development server 100 in accordance with a command from the CPU 101. Examples of the display 111 include various kinds of display, such as a cathode ray tube (CRT) display, a liquid crystal display (LCD), a plasma display, and an organic electro-luminescence (OEL) display.

The input signal processing unit 105 acquires an input signal from an input device 112 connected to the development server 100 and outputs the input signal to the CPU 101. Examples of the input device 112 include a pointing device such as a mouse, a touch panel, a touch pad, or a trackball, a keyboard, a remote controller, and a button switch. A plurality of kinds of input devices may be connected to the development server 100.

The media reader 106 is a reading device that reads programs or data recorded in a storage medium 113. Examples of the storage medium 113 include a magnetic disk, an optical disc, a magneto-optical disk (MO), and a semiconductor memory. Examples of the magnetic disk include a flexible disk (FD) and an HDD. Examples of the optical disc include a compact disc (CD) and a digital versatile disc (DVD).

For example, the media reader 106 copies a program or data read from the storage medium 113 in another storage medium such as the RAM 102 or the HDD 103. The read program is executed by the CPU 101, for example. The storage medium 113 may be a portable storage medium and used for distribution of a program or data. The storage medium 113 or the HDD 103 may be referred to as a computer-readable storage medium.

The communication interface 107 is connected to the network 30 and performs communication with the client 31, the PaaS system 41, the FaaS system 42, the storage system 43, etc. via the network 30. For example, the communication interface 107 is connected to a communication device such as a switch or a router via a cable.

Figure 4:
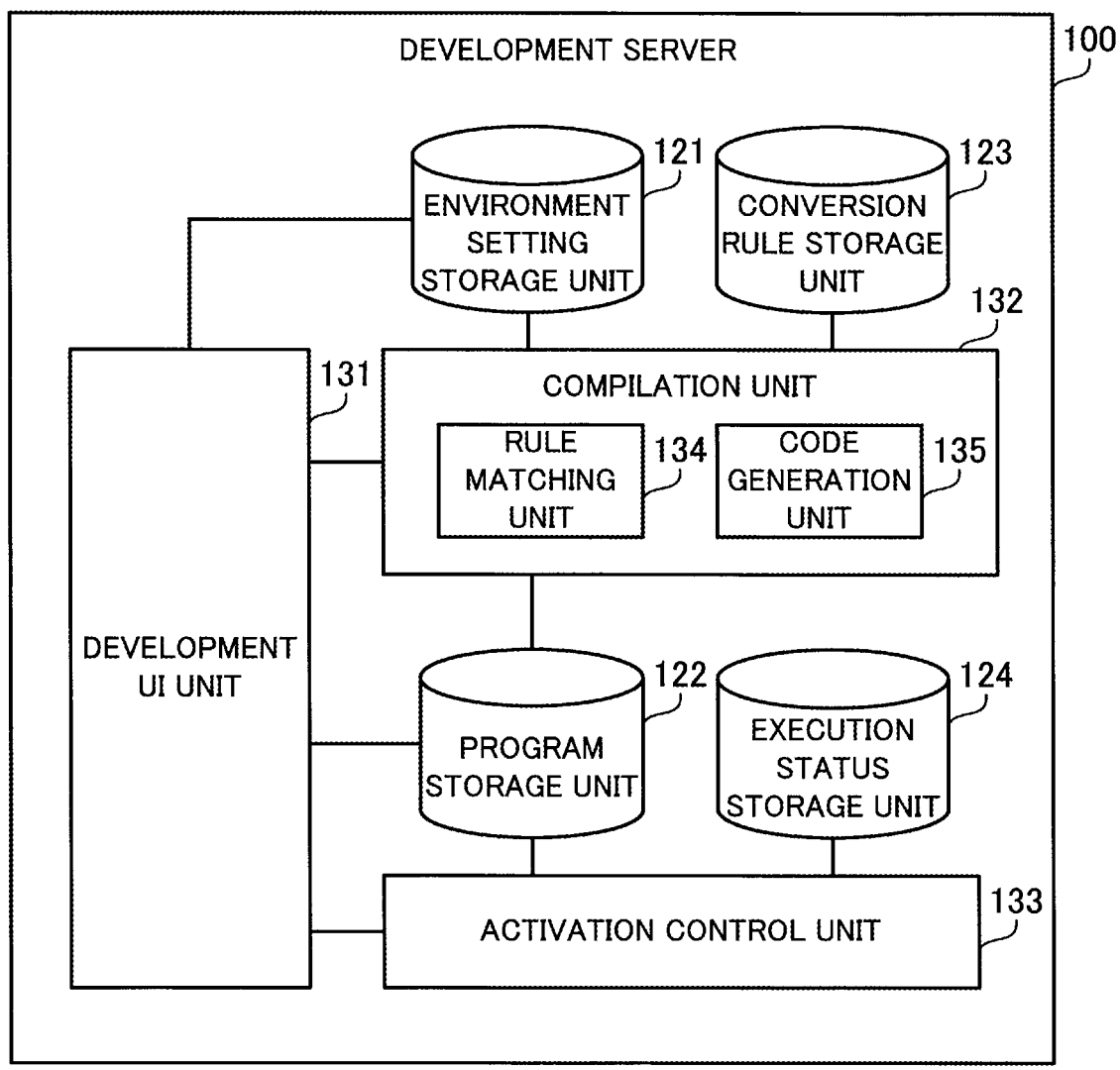
FIG. 4 is a block diagram illustrating a functional example of the development server.

FIG. 4 is a block diagram illustrating a functional example of the development server 100.

The development server 100 includes an environment setting storage unit 121, a program storage unit 122, a conversion rule storage unit 123, an execution status storage unit 124, a development user interface (UI) unit 131, a compilation unit 132, and an activation control unit 133. For example, the environment setting storage unit 121, the program storage unit 122, the conversion rule storage unit 123, and the execution status storage unit 124 are implemented by using storage areas ensured in the RAM 102 or the HDD 103. For example, the development UI unit 131, the compilation unit 132, and the activation control unit 133 are implemented by using programs.

The environment setting storage unit 121 holds environment setting information indicating settings for using the cloud system 40. Normally, when a developer creates application software and deploys the application software in the cloud system 40, the developer needs to make a contract or the like in advance to obtain a right to use the cloud system 40. Thus, the environment setting storage unit 121 holds environment setting information inputted by developers. The environment setting information includes authentication information for authenticating the users of the cloud system 40. For example, the authentication information includes various kinds of information called user IDs, passwords, access keys, access tokens, credentials, etc.

A plurality of cloud services offered by the same cloud operator, namely, the plurality of cloud services of the cloud system 40, are usable by using the same authentication information. However, different kinds of authentication information may be used for different cloud services offered by the same cloud operator. When a different cloud system other than the cloud system 40 is usable, environment setting information corresponding to this different cloud system is stored in the environment setting storage unit 121.

The program storage unit 122 holds a source code of an unconverted program created on the basis of information inputted by a developer. In addition, the program storage unit 122 holds a group of converted programs for the cloud system 40 generated from the unconverted program. In addition, the program storage unit 122 holds constraint information inputted by the developer. The constraint information indicates a request or a constraint condition specified by the developer in generating the corresponding converted programs.

The conversion rule storage unit 123 holds a plurality of conversion rules for converting a program for a single server into distributed processing programs for the cloud system 40. Each of the conversion rules includes a code pattern and a template. An individual template is a template of a program in which processing for using a cloud service is described by using arguments. By assigning values extracted from an unconverted program and environment setting information to arguments in a template, converted programs are generated. An individual code pattern indicates codes (a group of commands) included in the corresponding unconverted program to which the corresponding template is applicable. The codes matching a code pattern in an unconverted program are converted into cloud codes by using a template.

The execution status storage unit 124 holds execution status information indicating execution statuses of service instances. At least one service instance among a group of converted programs is activated. Each service instance is given unique identification information. An individual service instance has one of the execution statuses of "none", "running, "terminated", and "removed".

The development UI unit 131 provides the client with a user interface and receives various kinds of input information from the client 31. For example, the development UI unit 131 sends screen information indicating a development web page displayed on a web browser to the client 31 and receives data inputted on the web page from the client 31. It is possible to say that the development UI unit 131 provides the client 31 with an integrated development environment (IDE), and this IDE may be referred to as a cloud IDE.

The development UI unit 131 receives environment setting information from the client 31 and stores the received environment setting information in the environment setting storage unit 121. In addition, the development UI unit 131 receives a program from the client 31 and updates an unconverted program stored in the program storage unit 122. In addition, the development UI unit 131 receives a program change request from the client 31 and instructs the compilation unit 132 to change a program. In addition, the development UI unit 131 receives an execution status change request from the client 31 and instructs the activation control unit 133 to deploy, terminate, or remove a service instance.

The compilation unit 132 offers a program conversion service (a compilation service). While both the development UI unit 131 and the compilation unit 132 are disposed in the development server 100 in FIG. 4, the compilation unit 132 may be disposed in a server computer different from the development server 100 including the development UI unit 131. The compilation unit 132 converts a program for a single server into distributed processing programs for the cloud system 40 in accordance with an instruction from the development UI unit 131. In this operation, the compilation unit 132 reads an unconverted program from the program storage unit 122, generates a group of converted programs by referring to the environment setting storage unit 121 and the conversion rule storage unit 123, and stores the generated group of converted programs in the program storage unit 122.

The compilation unit 132 includes a rule matching unit 134 and a code generation unit 135. The rule matching unit 134 detects codes in an unconverted program, the codes being applicable to a conversion rule stored in the conversion rule storage unit 123, by pattern matching. The code generation unit 135 generates converted programs by applying values extracted from the detected codes and environment setting information stored in the environment setting storage unit 121 to a template of the conversion rule.

The activation control unit 133 offers an activation service (a launcher service) for service instances. While both the development UI unit 131 and the activation control unit 133 are disposed in the development server 100 in FIG. 4, the activation control unit 133 may be disposed in a server computer different from the development server 100 including the development UI unit 131. In addition, the compilation unit 132 and the activation control unit 133 may be disposed in different server computers. The activation control unit 133 reads a group of converted programs from the program storage unit 122 in accordance with an instruction from the development UI unit 131 and deploys, terminates, or removes a service instance by using the group of converted programs. In addition, the activation control unit 133 updates the execution status information stored in the execution status storage unit 124.

When deploying a new service instance in the cloud system 40, the activation control unit 133 gives a unique service instance ID to this service instance. In addition, the activation control unit 133 converts constituent element names such as function names or container names described in a group of converted programs into unique names so that the new service instance does not conflict with the existing service instances deployed in the cloud system 40. For example, the activation control unit 133 converts constituent element names in such a manner that the constituent element names include their respective service instance IDs given.

When deploying a service instance, the activation control unit 133 sends a creation request to each of the PaaS system 41, the FaaS system 42, and the storage system 43 in accordance with a predetermined rule (for example, by using a predetermined API). The creation request may include generated converted programs or other setting information. For example, an application program executed on the platform is sent to the PaaS system 41, and a function program is sent to the FaaS system 42.

When terminating a service instance, the activation control unit 133 sends a termination request to each of the PaaS system 41 and the FaaS system 42 in accordance with a predetermined rule. In this way, information about the service instance is removed from the PaaS system 41 and the FaaS system 42. Since a terminated service instance could be deployed again, the object data stored in the storage system 43 is not removed at this time. When removing a service instance, the activation control unit 133 sends a removal request to the storage system 43 in accordance with a predetermined rule. In this way, the object data stored in the storage system 43 is removed.

FIG. 5 illustrates an example of an environment setting management table.

This environment setting management table 141 is stored in the environment setting storage unit 121. The environment setting management table 141 includes columns "cloud system name" and "authentication information". Names of cloud systems or cloud operators are registered in the column "cloud system name". In FIG. 5, "system A" represents the cloud system 40. Authentication information inputted by developers is registered in the column "authentication information". FIG. 5 assumes that the PaaS system 41, the FaaS system 42, and the storage system 43 are usable by the same authentication information. Authentication information about a plurality of cloud systems may be registered in the environment setting management table 141, and authentication information inputted by different developers may be registered in the environment setting management table 141.

The kind of information used for authentication varies depending on the cloud system. For example, in the case of the cloud system 40, "xxx", "yyy", "us-west-2", and "123"

are registered as the access key ID, the secret access key, the region, and the account ID, respectively.

FIG. 6 illustrates an example of an unconverted program and constraint information.

The program 142 is stored in the program storage unit 122. The program 142 is an unconverted program created from information inputted by a developer. In FIG. 6, the program 142 has been created as a server-side script in Node.js format.

The program 142 uses an Express module that controls communication using Hypertext Transfer Protocol (HTTP) and a BodyParser module that extracts data based on a POST method from an HTTP request. With the program 142, port 3000 of the Transmission Control Protocol (TCP) awaits an HTTP request, and when the port 3000 receives a POST-method HTTP request having a URL including "/csv", a function "app.post" is executed.

With this "app.post", a data name and comma-separated value (CSV) format text are extracted from the HTTP request, and the CSV format text is assigned to a variable "csv" in association with the data name. Comman-separated character strings are extracted from the CSV format text per row, and an individual comman-separated character string is assigned to a variable "record". Namely, the comma-separated character strings are split into a plurality of portions, separated at commas. Next, an electronic mail is sent to a predetermined mail address, and an HTTP response corresponding to the HTTP request is replied.

The constraint information 143 is stored in the program storage unit 122. The constraint information 143 is information received from the client 31. In FIG. 6, constraint information 143 includes parameters "runOnDemand" and "scalable".

The parameter "runOnDemand" is a flag indicating whether to convert the corresponding program into a program that uses a FaaS service. In FIG. 6, since "runOnDemand" is set to true, a FaaS service is used. The parameter "scalable" is a flag indicating whether to convert the corresponding program into a program whose parallelism is automatically changed depending on the load. In FIG. 6, "scalable" is set to true. Thus, when the load is heavy, scale-out to increase the parallelism is automatically performed. In contrast, when the load is light, scale-in to decrease the parallelism is automatically performed.

While the present description assumes that the development server 100 deploys application software in the cloud system 40, a user may be allowed to select a deployment-destination cloud system. A name of a deployment-destination cloud system may be registered in the constraint information 143.

Figure 7:
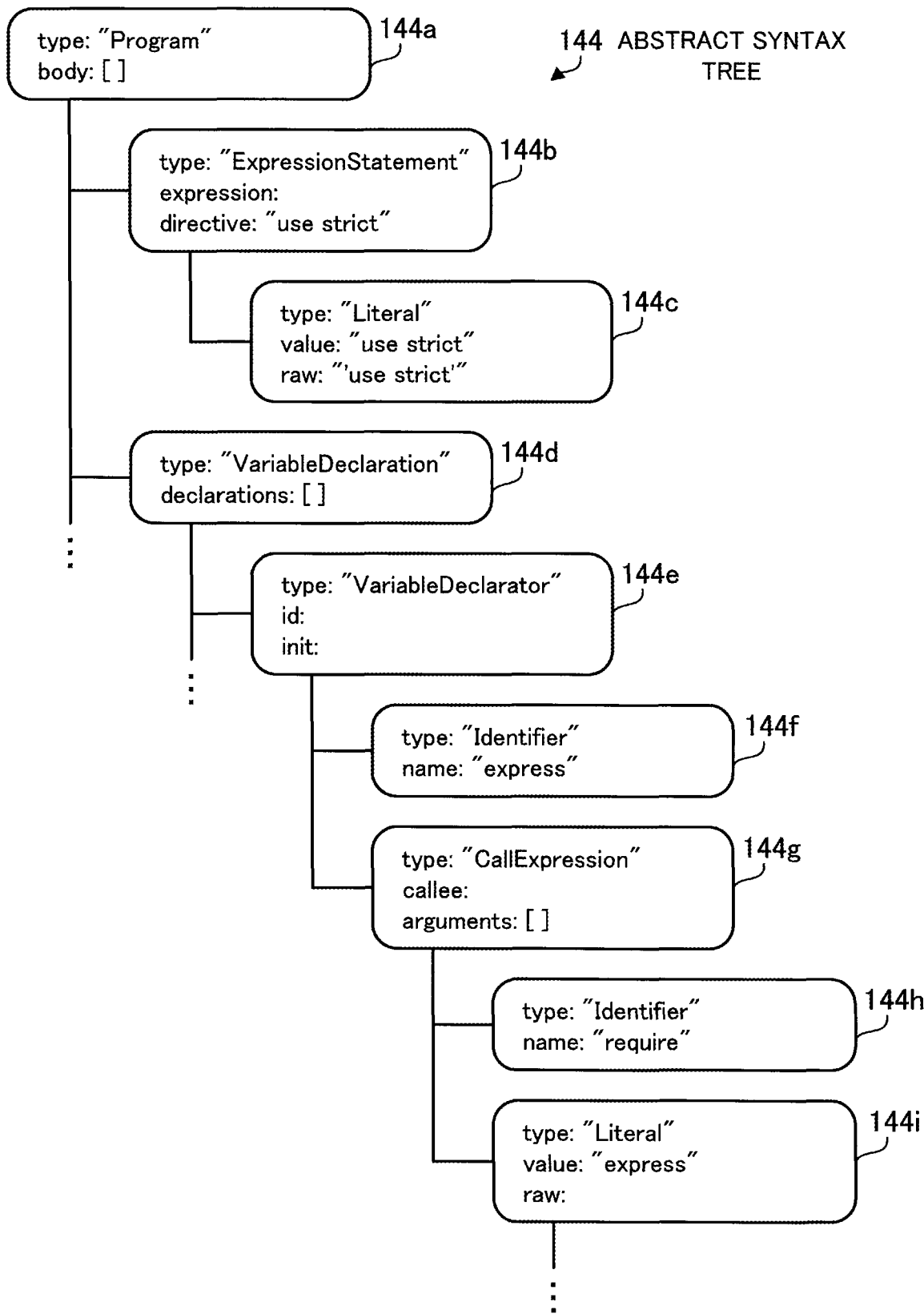
FIG. 7 illustrates an example of an abstract syntax tree that corresponds to the unconverted program.

FIG. 7 illustrates an example of an abstract syntax tree that corresponds to the unconverted program.

When the compilation unit 132 generates a group of converted programs from the program 142, the compilation unit 132 analyzes the program 142 and generates this abstract syntax tree 144. The abstract syntax tree 144 includes a plurality of nodes connected to form a tree structure. FIG. 7 illustrates a part of a group of nodes generated from the program 142 in FIG. 6. The abstract syntax tree 144 includes nodes 144a to 144i.

The node 144a is a root node. The node 144a is a program type node and has child nodes relating to a body thereunder. The node 144b is a subordinate node of the node 144a. The node 144b is an expression statement type node and indicates a command "use strict". The node 144c is a subordinate node of the node 144b. The node 144c is a literal type node and indicates a character string "use strict". The nodes 144b and 144c correspond to the first row in the program 142 in FIG. 6.

The node 144d is a subordinate node of the node 144a. The node 144d is a variable declaration type node and has child nodes relating to a variable declarator thereunder. The node 144e is a subordinate node of the node 144d. The node 144e is a variable declarator type node and has child nodes relating to a variable name and an initial value thereunder. The node 144f is a subordinate node of the node 144e. The node 144f is an identifier type node and indicates a variable name "express". The node 144g is a subordinate node of the node 144e. The node 144g is a call expression type node and has child nodes relating to a function name and an argument thereunder.

The node 144h is a subordinate node of the node 144g. The node 144h is an identifier type node and indicates a function name "require". The node 144i is a subordinate node of the node 144g. The node 144i is a literal type node and indicates an argument "express". The nodes 144e to 144i correspond to the second row in the program 142 in FIG. 6. In this way, lexical analysis and syntax analysis of the program 142 are performed, and the abstract syntax tree 144 indicating the structure of the program 142 is generated.

FIG. 8 illustrates an example of a conversion rule table.

This conversion rule table 145 is stored in the conversion rule storage unit 123. In the conversion rule table 145, a plurality of conversion rules are registered in advance about the deployment-destination cloud system 40. The conversion rule table 145 includes columns "rule ID", "rule name", "code pattern", "applied condition", "template", and "priority level".

In the column "rule ID", identification information for identifying the conversion rules is registered. In the column "rule name", names representing characteristics of the conversion rules are registered. In the column "code pattern", characteristics of the template application target codes among the codes included in the corresponding unconverted program are registered. The code patterns may be described in regular expressions. In the column "applied condition", conditions other than the corresponding code pattern among the conditions for applying the corresponding template may be registered. An applied condition may include that a certain value is described in the constraint information 143.

In the column "template", a template of a converted program described by using arguments is registered. By assigning values to arguments in the template, an executable converted program is obtained. As values assigned to arguments, values extracted from the unconverted program or authentication information registered in the environment setting management table 141 may be used. For ease of description, the templates are not described in program format in FIG. 8. In the column "priority level", the priority levels of the conversion rules are registered. For example, the priority levels are expressed in a plurality of levels such as high, medium, and low. When the code patterns of a plurality of conversion rules are applicable to a certain code, the template of a conversion rule having the highest priority level is preferentially applied to the code.

For example, conversion rules 1 to 5 are registered in the conversion rule table 145. The conversion rule 1 is "RunOnServer" and is applied to a root node in an abstract syntax tree. The conversion rule 1 has a template for converting a program so that all codes are executed in a server function called on a server execution environment. The conversion rule 2 is "DeclareContainer" and is applied to an empty variable declaration when "runOnDemand" described in the constraint information 143 is true. The conversion rule 2 has a template for creating a container corresponding to a variable in the storage system 43.

The conversion rule 3 is "PutInContainer" and is applied to an assignment statement for assigning a value to a variable to which the conversion rule 2 has already been applied. The conversion rule 3 has a template for calling a PUT API for writing a value in a container created by the conversion rule 2. The conversion rule 3 is dependent on the conversion rule 2. The conversion rule 4 is "DeclareFunctionBehindContainer". When the conversion rule 3 has already been applied to an assignment statement of a variable, the conversion rule 4 is applied to a statement for performing calculation using a value of the variable after the assignment statement. The conversion rule 4 has a template for creating a function for the FaaS system 42. The conversion rule 4 is dependent on the conversion rule 3.

The conversion rule 5 is "ParallelizeForOf". When "runOnDemand" described in the constraint information 143 is true and "scalable" is true, the conversion rule 5 is applied to a for-of block. A for-of block indicates loop processing using a loop variable (an iterator variable). The conversion rule 5 has a template for creating a container corresponding to a loop variable in the storage system 43 and a template for creating a function for the FaaS system 42 corresponding to loop processing.

FIG. 9 illustrates an example of a template included in the conversion rule table.

A template 145a is a template included in the conversion rule 3 in FIG. 8. The template 145a includes "accessKeyId", "secretAccessKey", and "region" as arguments. These three arguments correspond to the access key ID, the secret access key, and the region registered in the environment setting management table 141. In addition, the template 145a includes "object.name", "property.name", and "right" as arguments. These three arguments correspond to a variable name, a key, and an assignment value extracted from the unconverted program.

With the template 145a, the storage system 43 in the cloud system 40 is accessed by using the access key ID and the secret access key, and a converted program that writes data in key-value format in a container corresponding to a variable is obtained.

Figure 10:
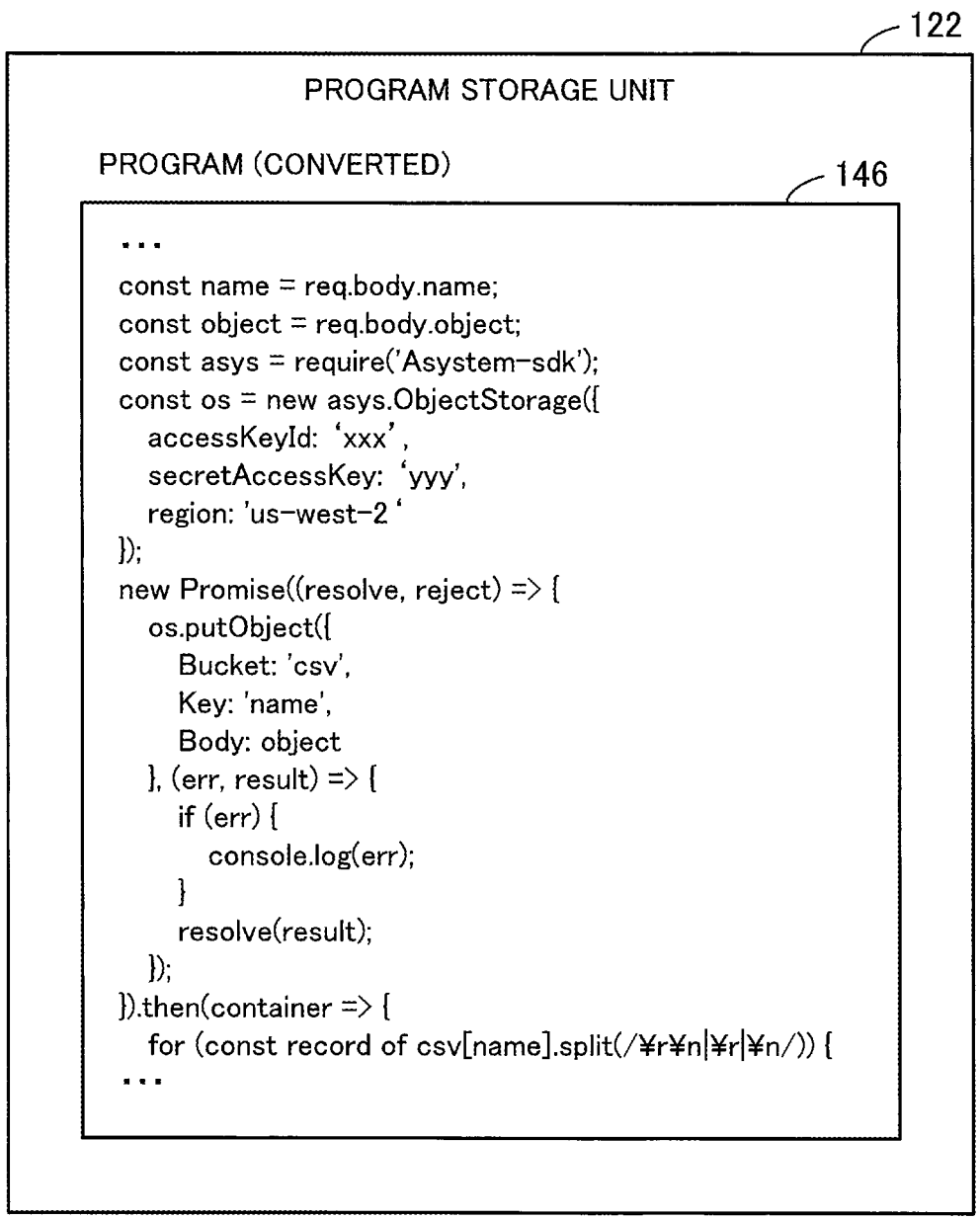
FIG. 10 illustrates an example of a converted program.

FIG. 10 illustrates an example of a converted program.

This program 146 is stored in the program storage unit 122. The program 146 is a converted program generated from the environment setting management table 141, the program 142, and the template 145a. The "xxx" in the environment setting management table 141 has been assigned to the argument "accessKeyId". The "yyy" in the environment setting management table 141 has been assigned to the argument "secretAccessKey". The "us-west-2" in the environment setting management table 141 has been assigned to the argument "region". In addition, "csv" in the program 142 has been assigned to the argument "object.name". The "name" in the program 142 has been assigned to the argument "property.name". The "object" in the program 142 has been assigned to the argument "right".

With the program 146, the storage system 43 is accessed by using the access key ID "xxx" and the secret access key "yyy", and the value of the variable "object" is written in the container "csv" in association with the value of the variable "name". For example, this program 146 is deployed in and is executed by the PaaS system 41.

Figure 11:
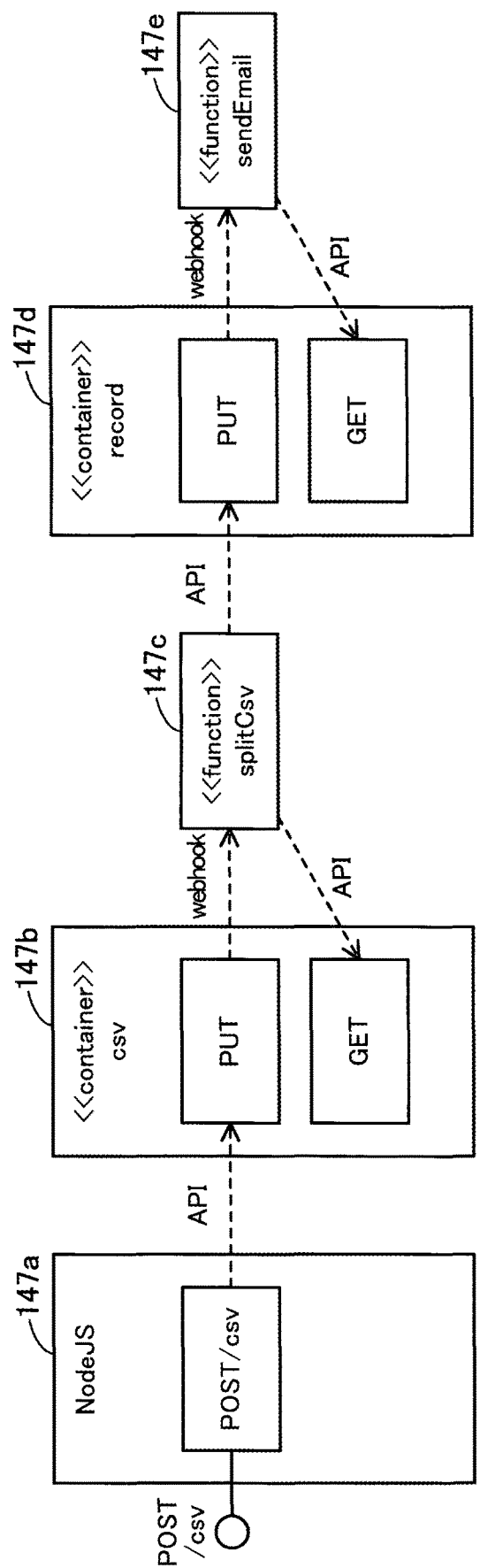
FIG. 11 illustrates examples of components included in the converted program.

FIG. 11 illustrates examples of components included in the converted program.

In the case of a group of converted programs generated from the program 142, application software includes components 147a to 147e.

The component 147a is an application program for starting a series of processing in response to reception of an HTTP request. The component 147a includes an interface for receiving a POST-method HTTP request specifying a URL including "/csv" and a function for processing this HTTP request. The component 147b is a container having a name "csv". The component 147b has a PUT API for writing data and a GET API for reading data. The component 147c is a FaaS function having a name "splitCsv". The component 147d is a container having a name "record". The component 147d includes a PUT API for writing data and a GET API for reading data. The component 147e is a FaaS function having a name "sendEmail".

The component 147a is executed in the PaaS system 41. The components 147c and 147e are executed in the FaaS system 42. The components 147b and 147d are executed in the storage system 43. The component 147a calls an API of the component 147b and writes data in the component 147b. When the data is written, the component 147c is activated by a webhook. The component 147c calls an API of the component 147b and reads data from the component 147b. In addition, the component 147c calls an API of the component 147d and writes data in the component 147d. When the data is written, the component 147e is activated by a webhook. The component 147e calls an API of the component 147d, reads data from the component 147d, and sends an electronic mail.

First, the conversion rule 1 in FIG. 8 is applied to the program 142 to generate the component 147a. Next, the conversion rule 2 in FIG. 8 is applied to "var csv={}" in the program 142 to generate the component 147b. Next, the conversion rule 3 in FIG. 8 is applied to "csv[name]=object" in the program 142, and the component 147a is updated to call the component 147b.

Next, the conversion rule 4 in FIG. 8 is applied to "csv[name].split" in the program 142 to generate the component 147c. Next, the conversion rule 5 in FIG. 8 is applied to "for ( . . . record of . . . ){ . . . }" in the program 142 to generate the components 147d and 147e. In addition, the component 147c is updated to call the component 147d.

Figure 12:
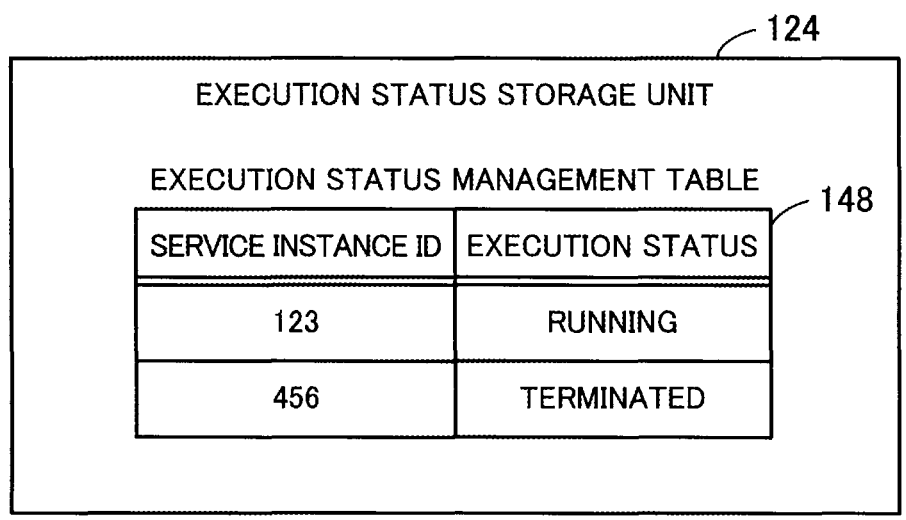
FIG. 12 illustrates an example of an execution status management table.

FIG. 12 illustrates an example of an execution status management table.

This execution status management table 148 is stored in the execution status storage unit 124. The execution status management table 148 includes columns "service instance ID" and "execution status". Identification information for identifying the service instances is registered in the column "service instance ID". When a service instance is initially deployed, a service instance ID is given to the service instance so that this service instance does not conflict with other service instances.

Statuses of the service instances are registered in the column "execution status". A service instance has one of the execution statuses "none", "running", "terminated", and "removed". The execution status "none" indicates that the service instance has not been deployed in the cloud system 40. The execution status "running" indicates that the service instance has been deployed and is executable in the cloud system 40. The execution status "terminated" indicates that data has not been removed yet while the service instance has been terminated. When the execution status indicates "terminated", the service instance is redeployable. The execution status "removed" indicates that data has already been removed and the service instance is not redeployable.

Figure 13:
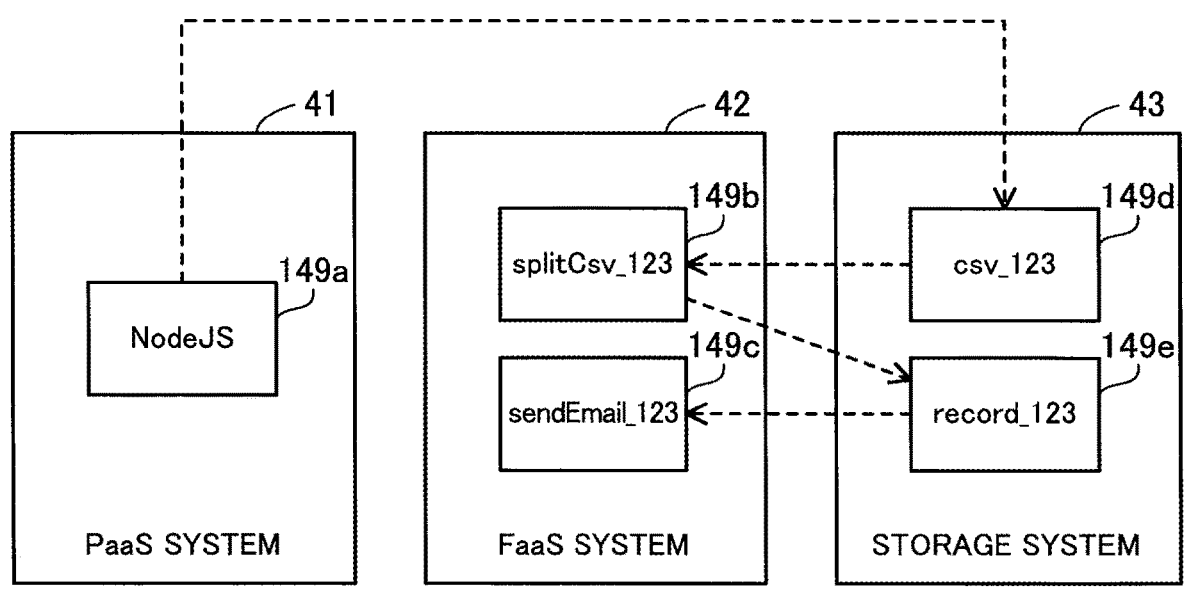
FIG. 13 illustrates a deployment example of instances.

FIG. 13 illustrates a deployment example of instances.

Instances 149a to 149e are formed as constituent elements of a service instance in the cloud system 40. The instance 149a is executed in the PaaS system 41. The instances 149b and 149c are executed in the FaaS system 42. The instances 149d and 149e are executed in the storage system 43. The instance 149a is activated by the component 147a. The instance 149b is activated by the component 147c. The instance 149c is activated by the component 147e. The instance 149d is activated by the component 147b. The instance 149e is activated by the component 147d.

When receiving an HTTP request, the instance 149a starts processing and sends data to the instance 149d. When the instance 149d stores the data, the instance 149b starts processing, receives the data from the instance 149d, and sends the data to the instance 149e. When the instance 149e stores the data, the instance 149c starts processing and receives the data from the instance 149e.

When the development server 100 receives a deployment request from the client 31, the instances 149a to 149e are formed as illustrated in FIG. 13. FIG. 13 assumes that the service instance ID of the service instance to be deployed is "123". Then, for example, the function name of the instance 149b is changed to "splitCsv_123" including the service instance ID. In addition, the function name of the instance 149c is changed to "sendEmail_123" including the service instance ID. In addition, the container name of the instance 149d is changed to "csv_123" including the service instance ID. In addition, the container name of the instance 149e is changed to "record_123" including the service instance ID.

Subsequently, when the development server 100 receives a termination request from the client 31, the instance 149a is removed from the PaaS system 41, and the instances 149b and 149c are removed from the FaaS system 42. However, the instances 149d and 149e in the storage system 43 are not removed to keep the data. Subsequently, when the development server 100 receives a removal request from the client 31, the instances 149d and 149e are removed from the storage system 43.

Next, a processing procedure of the development server 100 will be described.

Figure 14:
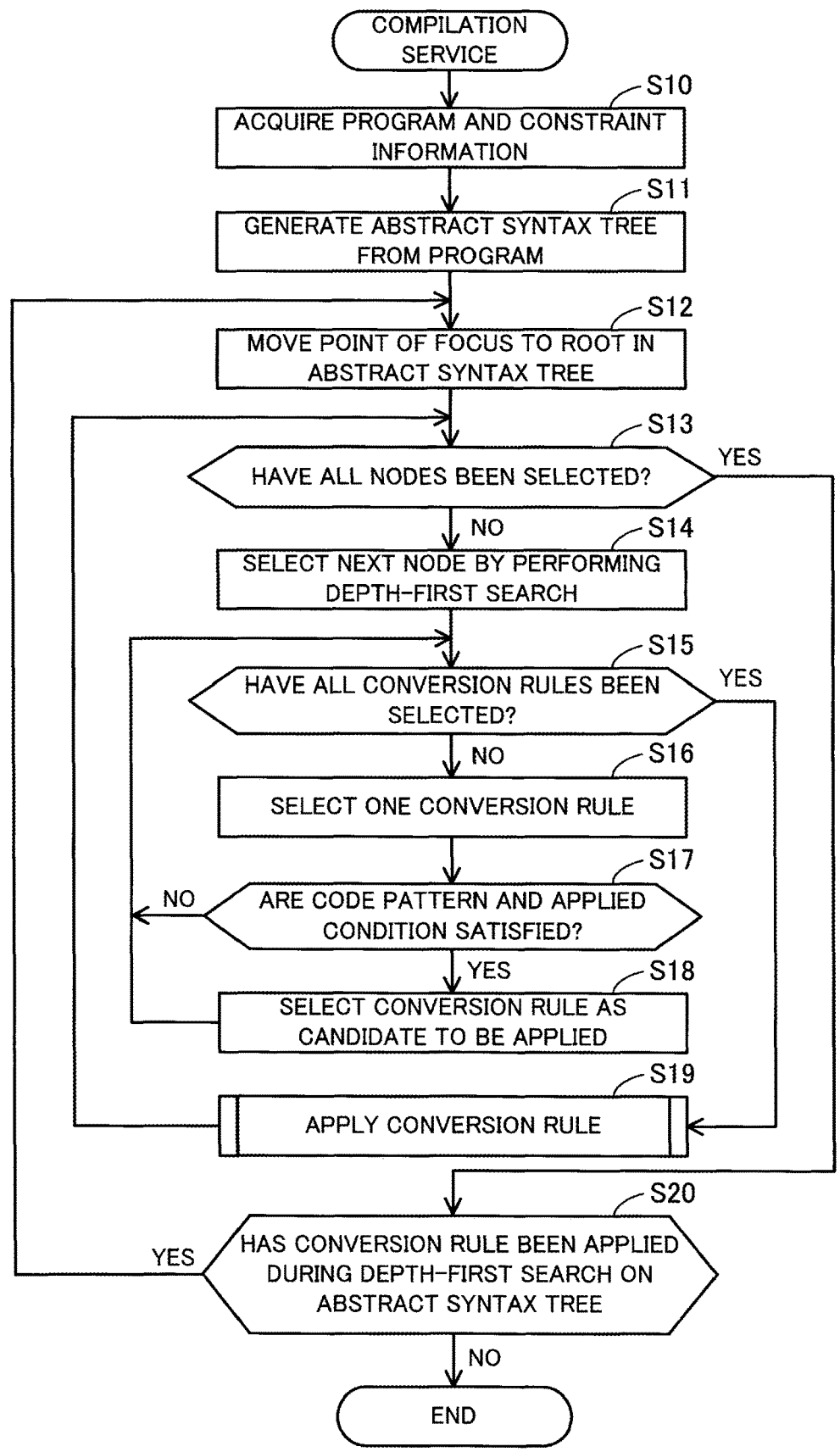
FIG. 14 is a flowchart illustrating an example of a procedure for a compilation service.

FIG. 14 is a flowchart illustrating an example of a procedure about a compilation service.

(S10) The compilation unit 132 acquires an unconverted program and constraint information 143.

(S11) The rule matching unit 134 analyzes the unconverted program through lexical analysis, syntax analysis, etc., to generate an abstract syntax tree that indicates a structure of the unconverted program.

(S12) The rule matching unit 134 moves the point of focus to a root in the abstract syntax tree.

(S13) The rule matching unit 134 determines whether all the nodes included in the abstract syntax tree have been selected during the depth-first search starting at the root and performed after the most recently step S12. If all the nodes in the abstract syntax tree have been selected, the processing proceeds to step S20. If there is an unselected node, the processing proceeds to step S14.

(S14) The rule matching unit 134 selects a next node by performing the depth-first search from the current point of focus and moves the point of focus to the selected node. If the current point of focus is the root, the rule matching unit 134 selects the root node. If the current point of focus is a node having a child node thereunder, the rule matching unit 134 selects the child node. If the current point of focus is a node other than a root node and if this node does not have any child node thereunder, the rule matching unit 134 moves the point of focus back to a parent node having an unselected child node thereunder and selects the unselected child node.

(S15) The rule matching unit 134 determines whether all the conversion rules registered in the conversion rule table 145 have been selected for the node selected in step S14. If all the conversion rules have been selected, the processing proceeds to step S19. If there is an unselected conversion rule, the processing proceeds to step S16.

(S16) The rule matching unit 134 selects one unselected conversion rule from the plurality of conversion rules registered in the conversion rule table 145.

(S17) The rule matching unit 134 determines whether the node selected in step S14 satisfies the code pattern of the conversion rule selected in step S16. In addition, the rule matching unit 134 determines whether the constraint information 143 and other program conversion statuses satisfy the applied condition of the conversion rule selected in step S16. If both the code pattern and the applied condition are satisfied, the processing proceeds to step S18. If not, the processing proceeds to step S15.

(S18) The rule matching unit 134 selects the conversion rule selected in step S16 as a candidate to be applied. Next, the processing proceeds to step S15.

(S19) The code generation unit 135 applies one of the candidates to be applied, which have been selected in step S18, to the node selected in step S14 and generates a converted program. Next, the processing proceeds to step S13. The application of the conversion rule will be described in detail below.

(S20) The rule matching unit 134 determines whether a conversion rule has been applied to at least one node in the abstract syntax tree during the depth-first search performed after the most recent step S12. If there is a node to which a conversion rule has been applied, the processing returns to step S12, and the rule matching unit 134 performs the depth-first search again on the abstract syntax tree. If there is not a node to which a conversion rule has been applied, the rule matching unit 134 ends the compilation service.

Figure 15:
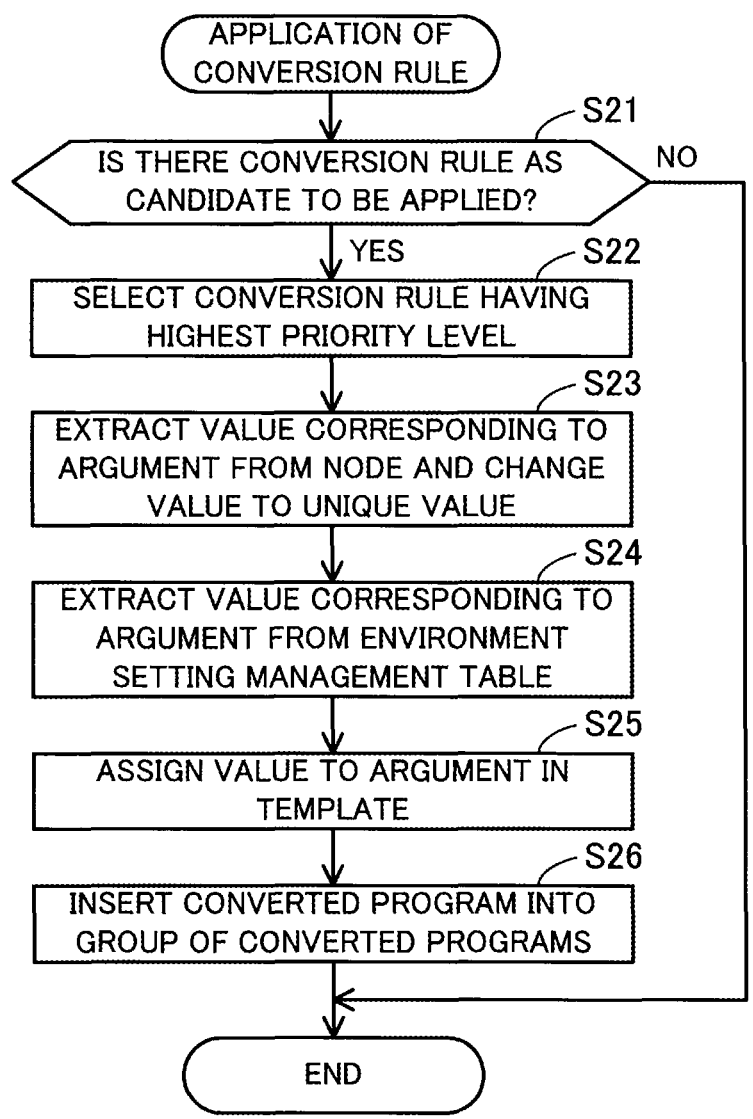
FIG. 15 is a flowchart illustrating an example of a procedure for application of a conversion rule.

FIG. 15 is a flowchart illustrating an example of a procedure about application of a conversion rule.

This application of a conversion rule is performed in the above step S19.

(S21) The code generation unit 135 determines whether there is at least one conversion rule as a candidate to be applied, the conversion rule having been selected for the focused node. If there is a conversion rule as a candidate to be applied, the processing proceeds to step S22. If there is not a conversion rule as a candidate to be applied, the code generation unit 135 ends the present processing.

(S22) The code generation unit 135 selects a conversion rule having the highest priority level among the conversion rules as the candidates to be applied. If there is only one candidate to be applied, the code generation unit 135 selects this conversion rule.

(S23) The code generation unit 135 determines an argument in a template included in the conversion rule selected in step S22. The code generation unit 135 extracts a value corresponding to the determined argument from the focused node. Examples of the values to be extracted include a variable name and a function name used in the unconverted program. In addition, the code generation unit 135 changes the extracted value so that this value becomes a unique value in the converted program.

(S24) The code generation unit 135 reads authentication information corresponding to the cloud system 40 to be used from the environment setting management table 141. The code generation unit 135 extracts a value corresponding to the argument determined in step S23 from the read authentication information.

(S25) The code generation unit 135 assigns the values extracted in steps S23 and S24 to the arguments in the template and generates a converted program. For example, the code generation unit 135 replaces a predetermined character string indicating the argument by the value extracted in step S23 or S24.

(S26) The code generation unit 135 inserts the converted program generated in step S25 into a group of converted programs. A plurality of fragmented programs for using a plurality of cloud services may be generated from a single unconverted program.

Figure 16:
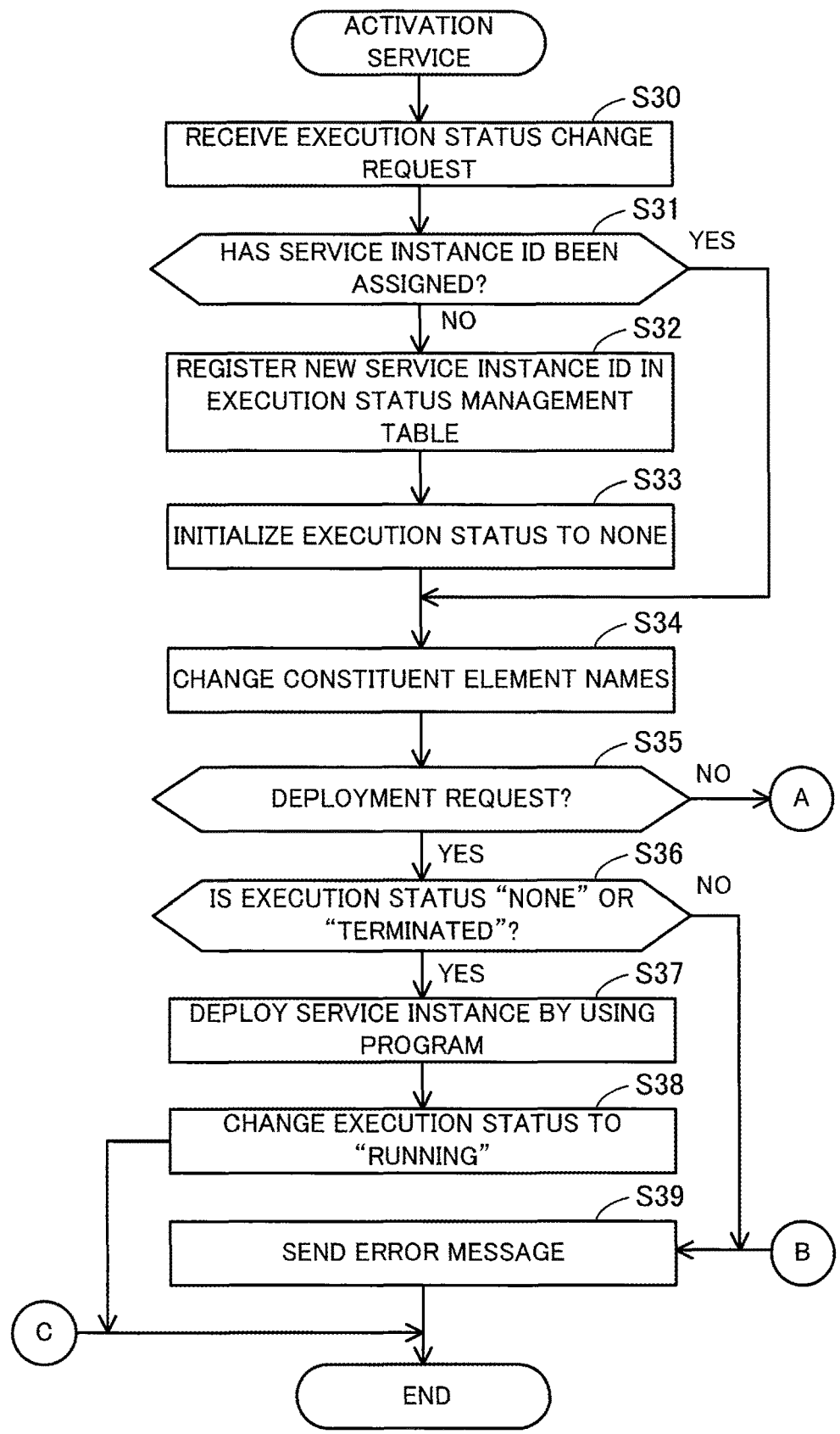

FIGS. 16 and 17 are flowcharts illustrating an example of a procedure about an activation service.

(S30) The development UI unit 131 receives an execution status change request. The execution status change request is a deployment request, a termination request, or a removal request.

(S31) The activation control unit 133 determines whether a service instance ID has already been assigned to a service instance specified by the execution status change request. A service instance ID has not been assigned to a new service instance that has never been deployed. When an existing service instance is redeployed, terminated, or removed, a service instance ID may be included in the execution status change request. If a service instance ID has already been assigned, the processing proceeds to step S34. If a service instance ID has not been assigned, the processing proceeds to step S32.

(S32) The activation control unit 133 generates a new service instance ID and registers the generated service instance ID in the execution status management table 148.

(S33) The activation control unit 133 initializes the execution status corresponding to the service instance ID registered in step S32 to "none".

(S34) The activation control unit 133 searches a group of converted programs corresponding to the service instance whose execution status is to be changed for constituent element names such as FaaS function names or container names. The activation control unit 133 changes the constituent element names to unique names so that this service instance does not conflict with the other service instances. For example, the activation control unit 133 adds a literal such as the service instance ID to the end of each of the function names or the container names described in the group of converted programs.

(S35) The activation control unit 133 determines whether the received execution status change request is a deployment request. If the execution status change request is a deployment request, the processing proceeds to step S36. If not, the processing proceeds to step S40.

(S36) The activation control unit 133 determines whether the execution status registered in the execution status management table 148 is "none" or "terminated". If the execution status is "none" or "terminated", the processing proceeds to step S37. If the execution status is neither "none" nor "terminated", namely, if the execution status is "running" or "removed", the processing proceeds to step S39.

(S37) The activation control unit 133 communicates with the PaaS system 41, the FaaS system 42, and the storage system 43 by using the group of converted programs whose constituent element names have been changed in step S34 and deploys the service instance in the cloud system 40. For example, there are cases in which the activation control unit 133 sends a converted program that is to be executed by the PaaS system 41 or the FaaS system 42. There are cases in which the sent converted program is executed immediately or executed when a predetermined event occurs. There are cases in which the activation control unit 133 sends setting information in accordance with a procedure defined in a converted program. For example, the activation control unit 133 sends setting information including a container name to the storage system 43.

(S38) The activation control unit 133 changes the execution status registered in the execution status management table 148 to "running". Next, the activation control unit 133 ends the present activation service.

(S39) The activation control unit 133 generates an error message indicating that the execution status change request has been denied. The development UI unit 131 sends an error message to the client 31.

The subsequent steps will be described with reference to FIG. 17.

(S40) The activation control unit 133 determines whether the received execution status change request is a termination request. If the execution status change request is a termination request, the processing proceeds to step S41. If not, the processing proceeds to step S44.

(S41) The activation control unit 133 determines whether the execution status registered in the execution status management table 148 is "running". If the execution status is "running", the processing proceeds to step S42. If not, namely, if the execution status is "none", "terminated", or "removed", the processing proceeds to step S39.

(S42) The activation control unit 133 communicates with the PaaS system 41, the FaaS system 42, and the storage system 43 by using the group of converted programs whose constituent element names have been changed in step S34 and causes the cloud system 40 to terminate the service instance. There are cases in which the activation control unit 133 sends setting information in accordance with a procedure defined in a converted program. For example, an application in the PaaS system 41 or a function in the FaaS system 42 is removed.

(S43) The activation control unit 133 changes the execution status registered in the execution status management table 148 to "terminated". Next, the activation control unit 133 ends the present activation service.

(S44) The activation control unit 133 determines whether the received execution status change request is a removal request. If the execution status change request is a removal request, the processing proceeds to step S45. If not, the activation control unit 133 ends the present activation service.

(S45) The activation control unit 133 determines whether the execution status registered in the execution status management table 148 is "terminated". If the execution status is "terminated", the processing proceeds to step S46. If not, namely, if the execution status is "none", "running", or "removed", the processing proceeds to step S39.

(S46) The activation control unit 133 communicates with the PaaS system 41, the FaaS system 42, and the storage system 43 by using the group of converted programs whose constituent element names have been changed in step S34 and causes the cloud system 40 to remove the service instance. For example, a container in the storage system 43 is removed.

(S47) The activation control unit 133 changes the execution status registered in the execution status management table 148 to "removed". Next, the activation control unit 133 ends the present activation service.

With the information processing system according to the second embodiment, a developer is able to create a program, as if its entire core logic is executed in a closed environment on a single computer, to generate a group of programs that use and coordinate a plurality of cloud services from the program. Thus, since the developer does not need to learn APIs or rules uniquely defined by cloud operators, the learning cost is reduced. In addition, since the developer does not need to directly write fragmented programs or setting information to be distributed in a plurality of cloud services, the developer is able to focus on the definition of the core logic. Thus, the development efficiency of application software using a plurality of cloud services is improved. In addition, in place of the developer, the development server 100 sends programs and setting information to a plurality of cloud services. Thus, since the developer does not need to access individual cloud services, service instances are deployed more efficiently.

In one aspect, the development efficiency of a distributed processing program is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
   a memory configured to hold:
      a code pattern,
      a first template indicating a format of a program which defines that a first server computer in a cloud system performs certain processing in response to a processing request, and
      a second template indicating a format of a program which sends the processing request to the first server computer via a network; and
   a processor configured to execute a process including:
      acquiring a first program,
      generating, by detecting a first code matching the code pattern in the first program and by using the first code and the first template, a second program which defines that the first server computer performs processing corresponding to the first code,
      generating, by detecting a second code dependent on the first code in the first program and by using the second code and the second template, a third program to be executed by a second server computer that offers cloud services different from cloud services offered by the first server computer,
      deploying a service instance in the first server computer, based on the second program that is generated, and
      deploying a service instance in the second server computer, based on the third program that is generated.

2. The information processing apparatus according to claim 1, wherein the processor sends the second program to the first server computer or sends setting information to the system, based on the second program.

3. The information processing apparatus according to claim 1,
   wherein the memory holds authentication information indicating a right to access the system, and
   wherein, when generating the third program, the processor embeds the authentication information in the third program, based on the second template.

4. The information processing apparatus according to claim 1,
   wherein the memory holds the first template and a priority level in association with the code pattern and holds a third template and another priority level in association with another code pattern, and
   wherein, when the first code matches both the code pattern and the another code pattern, the processor compares the priority level with the another priority level and preferentially uses the first template when the priority level is higher than the another priority level.

5. The information processing apparatus according to claim 1, wherein, when applying the second program to the system, the processor allocates identification information that does not conflict with other processing that is executed in the first server computer and changes a processing name described in the second program by using the identification information.

6. The information processing apparatus according to claim 1, wherein the code pattern indicates a definition of a variable, and the first server computer offers a storage service that holds data included in the processing request.

7. The information processing apparatus according to claim 1, wherein the code pattern indicates calculation using a value of a variable, and the first server computer offers a function execution service that executes a function specified by the processing request.

8. An information processing method comprising:
   acquiring, by a processor, a first program;
   generating, by the processor, by detecting a first code matching a predetermined code pattern in the first program and by using the first code and a first template indicating a format of a program which defines that a first server computer performs certain processing in response to a processing request, a second program which defines that the first server computer performs processing corresponding to the first code;
   generating, by the processor, by detecting a second code dependent on the first code in the first program and by using the second code and a second template indicating a format of a program which sends the processing request to the first server computer via a network, a third program to be executed by a second server computer that offers cloud services different from cloud services offered by the first server computer;
   deploying, by the processor, a service instance in the first server computer, based on the second program that is generated; and
   deploying, by the processor, a service instance in the second server computer, based on the third program that is generated.

9. A non-transitory computer-readable storage medium storing an information processing program that causes a computer to execute a process comprising:
   acquiring a first program;
   generating, by detecting a first code matching a predetermined code pattern in the first program and by using the first code and a first template indicating a format of a program which defines that a first server computer performs certain processing in response to a processing request, a second program which defines that the first server computer performs processing corresponding to the first code;

generating, by detecting a second code dependent on the first code in the first program and by using the second code and a second template indicating a format of a program which sends the processing request to the first server computer via a network, a third program to be executed by a second server computer that offers cloud services different from cloud services offered by the first server computer;

deploying a service instance in the first server computer, based on the second program that is generated; and deploying a service instance in the second server computer, based on the third program that is generated.

* * * * *